United States Patent
Hohman

(10) Patent No.: US 10,861,282 B2
(45) Date of Patent: Dec. 8, 2020

(54) SERVER PROCESS VALIDATION

(71) Applicant: AGS LLC, Las Vegas, NV (US)

(72) Inventor: Jasonlee Kissee Hohman, Sparks, NV (US)

(73) Assignee: AGS LLC, Las Vegas, NV (US)

( * ) Notice: Subject to any disclaimer, the term of this patent is extended or adjusted under 35 U.S.C. 154(b) by 565 days.

(21) Appl. No.: 15/787,649

(22) Filed: Oct. 18, 2017

(65) Prior Publication Data

US 2019/0114877 A1   Apr. 18, 2019

(51) Int. Cl.
| | |
|---|---|
| G07F 17/32 | (2006.01) |
| A63F 13/35 | (2014.01) |
| A63F 13/32 | (2014.01) |
| A63F 13/33 | (2014.01) |
| G07F 17/34 | (2006.01) |

(52) U.S. Cl.
CPC .......... *G07F 17/3241* (2013.01); *A63F 13/32* (2014.09); *A63F 13/33* (2014.09); *A63F 13/35* (2014.09); *G07F 17/3225* (2013.01); *G07F 17/3258* (2013.01); *G07F 17/34* (2013.01)

(58) Field of Classification Search
CPC .......... A63F 13/00; A63F 13/35; H04L 43/10; G07F 17/32; G07F 17/34; G07F 17/3241; G07F 17/3258
See application file for complete search history.

(56) References Cited

U.S. PATENT DOCUMENTS

| | | |
|---|---|---|
| 6,411,941 B1 | 6/2002 | Mullor et al. |
| 9,128,835 B2 | 9/2015 | Cadima et al. |
| 2004/0259643 A1 | 12/2004 | Gentles |
| 2007/0191109 A1* | 8/2007 | Crowder .................. G07F 17/32 463/42 |
| 2008/0318686 A1* | 12/2008 | Crowder ............. G07F 17/3225 463/42 |
| 2010/0062844 A1 | 3/2010 | Crowder, Jr. et al. |
| 2010/0075751 A1* | 3/2010 | Garvey ............... H04L 43/0811 463/30 |
| 2015/0336005 A1* | 11/2015 | Melnick .................. A63F 13/73 463/29 |

FOREIGN PATENT DOCUMENTS

WO   2008108916 A1   9/2008

OTHER PUBLICATIONS

Gaming Labs Certified, Standard Series, GLI-21: Client-Server Systems, Version: 2.2, Sep. 6, 2011, 26 Pages.

* cited by examiner

*Primary Examiner* — Jason Skaarup
(74) *Attorney, Agent, or Firm* — Vierra Magen Marcus LLP

(57) ABSTRACT

A server which provides game play services, such as game play services associated with progressive games, is described. The server provides the game play services to remote gaming machines via a network protocol and a network interface. The server is configured to monitor the network connections associated with the network protocol in real-time to ensure that only valid processes executing on the server are utilizing the network connections. In one embodiment, software ports, associated with the network protocol and utilized to provide the game play services, are monitored. The monitoring can prevent malicious programs from utilizing the network connections for fraudulent purposes.

20 Claims, 5 Drawing Sheets

US 10,861,282 B2

SERVER PROCESS VALIDATION

TECHNICAL FIELD

The present disclosure relates to operating gaming systems including gaming machines to generate wager-based games.

Slot-type electronic gaming machines, often referred as slot machines, are popular fixtures in casino environments. Slot machines use mechanical reels or video reels to present an outcome of a slot game to a player. Player's derive entertainment value from the unique ways in which the slot game is played and presented on the gaming machine.

Progressive games are a particularly popular type of slot game because of the potential to win huge awards. However, the potential to win huge awards also makes progressive games a target of fraudulent activities. One possible target is the progressive server which links a group of slot machines together to provide the progressive game.

Currently, progressive servers only check to see if the right known files are on the slot machine at power up. These checks won't catch a malicious file hiding in the background if the malicious file is introduced after the power up validation is completed. In view of the above, new security methods for progressive servers are desired.

OVERVIEW

Various embodiments of the present invention generally relate to securing the integrity of progressives games played on slot machine. In more detail, a server can be coupled to a group of slot machines to support a progressive game played on the slot machines. The server or the gaming machines can be targets of fraudulent attacks that can affect the integrity of the progressive game. To prevent fraudulent attacks on the server side, processes running on the server side, which support the progressive game play, can be validated in real-time while the progressive game is being played on the group of gaming machines.

In more detail, a server can be provided. The server can be generally characterized as including a processor, a random access memory (RAM), a persistent memory and a network interface. The processor can be configured to 1) initially validate a plurality of gaming executables stored on the persistent memory where the plurality of gaming executables includes a first gaming executable which utilizes a first network connection on the network interface to provide a first gaming service to a plurality of remote gaming machines and wherein, using a network protocol, a first local port is specified with the first network connection, 2) initially validate a real-time process validation executable stored on the persistent memory, 3) load the first gaming executable into the RAM for execution by the processor, 4) load the real-time process validation executable into the RAM for execution by the processor, 5) using the network protocol and the network interface, instantiate a plurality of network connections, including the first network connection, 6) using the real-time process validation executable, identify a plurality of local ports associated with the plurality of network connections which are currently instantiated, 7) using the real-time process validation executable, determine a first one of the plurality of local ports matches the first local port, 8) using the real-time process validation executable, when the first local port matches the first one of the plurality of local ports, determine a first process identifier (PID) associated with the first one and 9) using the real-time process validation executable, determine whether a first process associated with the first PID is the first gaming executable

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

In general, gaming systems which provide wager-based games are described. In particular, with respect to FIGS. 1 and 2, gaming system including a wager-based gaming machines in communication with network devices are described. With respect to FIG. 3, a server which can execute processes to provide services for linked gaming machines in a gaming system is described. For example, services associated with the play of a progressive game can be provided. With respect to FIGS. 4A and 4B, processes and information about processes executing on a server which are linked to critical ports associated with providing services for linked gaming machines in a gaming system are discussed. Finally, a method of validating processes on a server which provide services for linked gaming machines in a gaming system is described with respect to FIG. 5.

Figure 1:
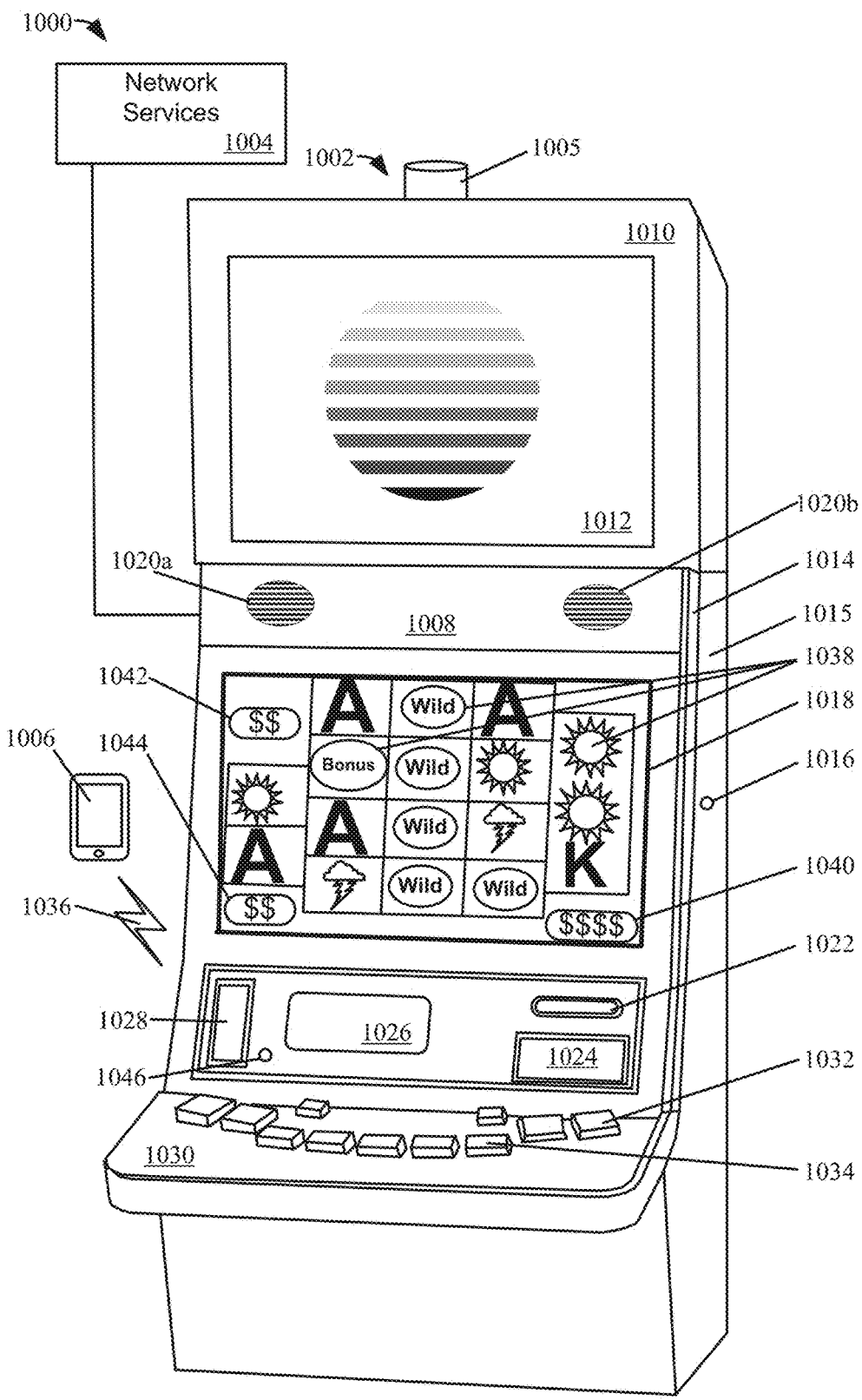
FIG. 1 illustrates a gaming system including a wager-based gaming machine in accordance with embodiments of the present invention.

In more detail, FIG. 1 illustrates a gaming system 1000 including a wager-based gaming machine 1002. First, details of the wager-based gaming machine 1002 are described with respect to FIG. 1. Second, with respect to FIG. 2, the interface of the wager-based gaming machines, such as 1002, with remote devices such as servers which support progressive games played on a wager-based gaming machine, such as 1002, are described. Then, with respect to FIGS. 3, 4A, 4B and 5, apparatus and methods for validating processes executing on a server that can be used to support progressive games played on a group of linked gaming machines are discussed. In particular, processes associated with critical communication ports on the server are validated.

Figure 2:
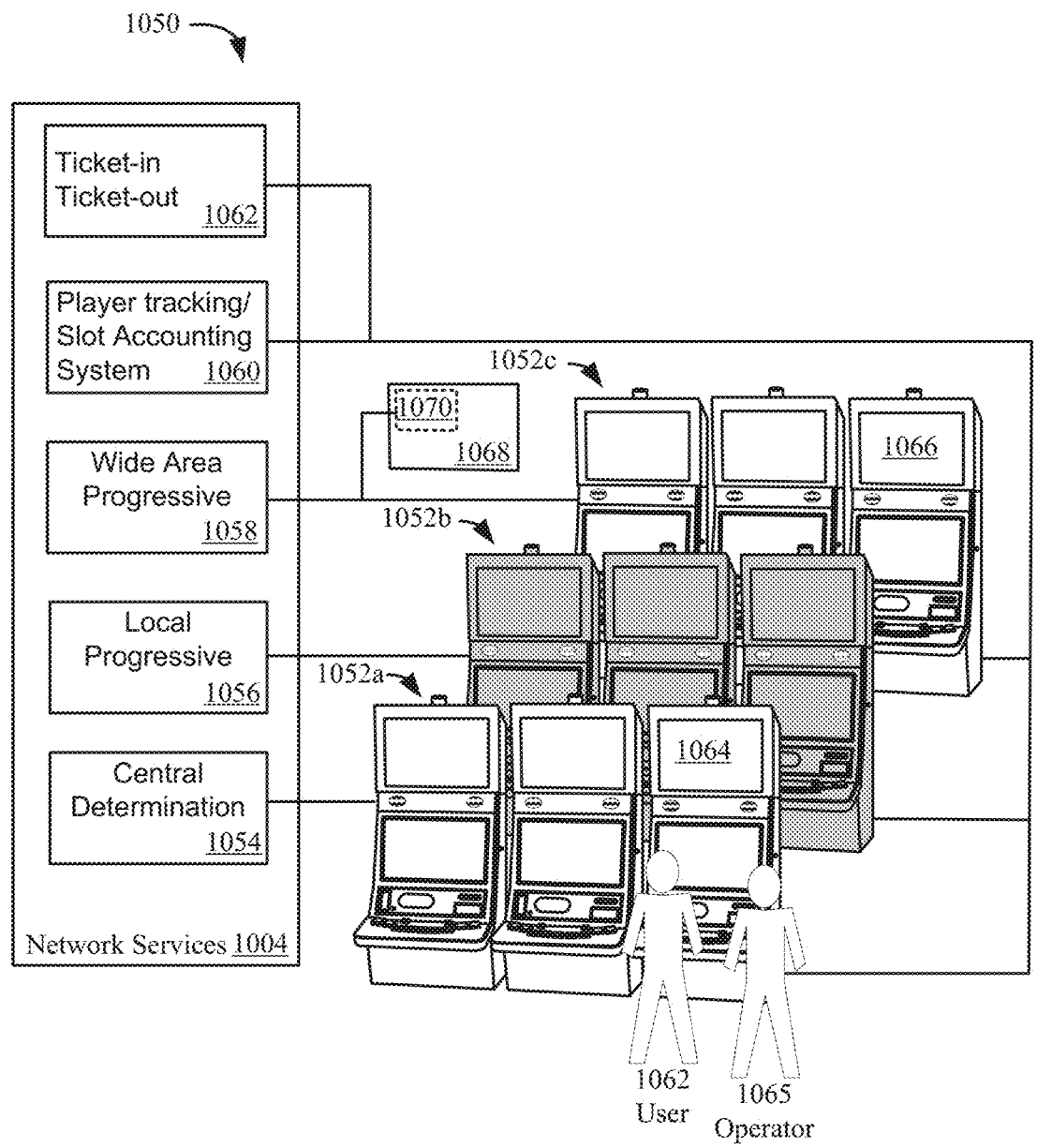
FIG. 2 illustrates a gaming system including three banks of gaming machines in accordance with embodiments of the present invention.

Returning to FIG. 1, the wager-based gaming machine 1002 can include wireless or wired communication interfaces which allow communications with a remote devices providing network services 1004, such as but not limited to a player tracking system or a progressive gaming system (Network services, including progressive gaming are described in more detail, with respect to FIG. 2). The player tracking system can be part of a slot accounting system. In addition, the gaming machine 1002 can include wireless communicate interfaces, such as wireless interface 1046, which allow communications with a nearby mobile device, such as a mobile phone 1006 or tablet computer, via a wireless connection 1036. The wireless interface 1046 can employ wireless communication protocols, such as Bluetooth™ or Wi-Fi.

The mobile phone or tablet computer can be utilized by a player or casino operator. A device carried by a player can be configured to perform gaming related functions, such as functions associated with transferring funds to or from the gaming machine or functions related to player tracking. A device carried by a casino operator can be configured to perform operator related functions, such as performing hand pays, responding to tilt conditions or collecting metering related information.

The gaming machine 1002 can include a cabinet 1008 and a top box 1010. The top box is mounted above the cabinet. The top box 1010 includes a display 1012. The display 1012 can be used to display video content, such as game art associated with the game played on the gaming machine 1002. For example, the game art can include an animated wheel. The animated wheel can be configured to spin and to stop to reveal a bonus award. In other examples, the video content can include advertising and promotions.

In alternate embodiments, the top box 1010 can include one or more mechanical devices in addition to the display or in lieu of the display. For example, a mechanical device, such as a mechanical wheel can be mounted to or within the top box 1010. The mechanical wheel can include markings that indicate various bonus awards. The wheel can be spun and stopped at a particular stopping point to reveal a bonus award. In yet other embodiments, the top box 1010 can include a plurality of displays.

The cabinet includes an entry instantiated as door 1014. The door 1014 swings outward and is coupled to a back portion 1015. The door 1014 includes a locking mechanism 1016. During operation, the door 1014 is locked. Typically, unlocking the door 1016 causes the gaming machine 1008 to enter a tilt mode where gaming functions, such as the play of a wager-based game, are not available. This tilt mode can be referred to as a hard tilt.

The cabinet 1008 can include a number of apertures that allow access to a portion of a number of devices which are mounted to the cabinet. These gaming devices can include, but are not limited to display 1018, speaker 1020a, speaker 1020b, a printer 1022, a bill acceptor 1024, a secondary display 1026, a card reader 1028 and a button panel 1030 including buttons 1032 and 1034. As described in more detail below, these gaming devices can be used to generate wager-based game play on the gaming machine 1002.

In particular embodiments, the bill acceptor 1024 can be used to accept currency or a printed ticket which can be used to deposit credits on the gaming machine 1002. The credits can be used for wagers. The printer 1022 can be used to print tickets to transfer credits from the gaming machine 1002. Typically, the tickets can be redeemed for cash or additional game play, such as game play on another gaming machine.

The bill acceptor 1024 and printer 1022 printer can be part of ticket-in/ticket-out (TITO) system 1062 in FIG. 2. The TITO system 1062 can be included in the network services 1004. The TITO system allows a ticket printed at a first gaming machine with a credit amount to be inserted into a bill acceptor at a second gaming machine and validated for game play. After validation, the credit amount associated with the ticket can be made available for game play on the second gaming machine. Additional details of the TITO system 1062 are described with respect to FIG. 2.

The bill acceptor 1024 can include a slot surround by a bezel which allows banknotes of various denominations or printed tickets to be inserted into the bill acceptor. The bill acceptor 1024 can include sensors for reading information from the banknotes and determining whether the banknotes inserted through the slot are valid. Banknotes determined to be invalid, such as damaged or counterfeit notes, can be ejected from the bill acceptor 1024. In some instances, the bill acceptor 1024 can include upgradeable firmware and a network connection. Via the network connection, new firmware, such as new counterfeit detection algorithms can be downloaded to the bill acceptor 1024.

The bill acceptor 1024 includes mechanisms for guiding the banknotes or printed tickets past the internal sensors. Banknotes or printed tickets which are accepted can be guided to a bill stacker (not shown) located within the cabinet 1008 of the gaming machine 1002. The bill stacker can hold a maximum number of bank notes or printed tickets, such as up to two thousand.

The gaming machine 1002 can include a sensor for detecting a fill level of the bill stacker. When the bill stacker is full or close to being full, the gaming machine 1002 can be placed in a tilt mode. Next, the cabinet door 1014 can be opened and the full bill stacker can be replaced with an empty one. Then, the door 1014 can be closed and the gaming machine 1002 can be restored to an operational mode in which it is available for game play.

One function of the printer 1022 is to print "cash out" tickets. In a "cash out," credits available on the gaming machine can be transferred to an instrument, such as a printed ticket, or electronically transferred to an account for later access. Typically, a "cash out" can be initiated in response to pressing one of the physical buttons, such as 1032 or 1034, or touch screen button output on a display, such as display 1018.

In one embodiment, the printer 1022 can be a thermal printer. The printer can be loaded with a stack of tickets, such as a stack with two hundred, three hundred or four hundred tickets. Mechanisms in the printer can grab tickets from the ticket stack and transport the tickets past the print heads for printing. The ticket stack can be located in an interior of the gaming machine cabinet 1008.

The printer 1022 can include sensors for detecting paper jams and a status of the ticket stack. When a paper jam or low ticket stack is detected, the gaming machine 1002 can enter a tilt mode where game play is suspended. In one embodiment, tower light 1005 can light to indicate the tilt status of the gaming machine 1002. After the tilt condition is cleared, such as by clearing the paper jam or replenishing the ticket stack, the gaming machine 1002 can enter an operational mode where game play is again available.

In particular embodiments, the printer 1022 can be coupled to a gaming machine controller (not shown) which resides within the cabinet of the gaming machine 1002. The gaming machine controller can be configured to send commands to the printer which cause a "cash out," ticket to be generated. In addition, the printer 1022 can be coupled to other systems, such as a player tracking system (e.g., 1060 in FIG. 2). When coupled to the player tracking system, commands can be sent to the printer 1022 to output printed tickets redeemable for comps (comps refer to complimentary awards, such as but not limited to free credits, a free drink, a free meal or a free room) or printed coupons redeemable for discounts on goods and services.

In additional embodiments, a wireless interface 1046 can be provided to generate the wireless connection 1036. The wireless connection can be established between the gaming machine 1002 and a mobile device, such as 1006. The wireless connection 1036 can be used to provide functions, such as but not limited to player tracking services, casino services (e.g., ordering drinks) and enhanced gaming features (e.g., displaying game play information on the mobile device). The wireless interface can be provided as a stand-alone unit or can be integrated into one of the devices, such as the bill/ticket acceptor 1022 and the card reader 1028. In addition, the bill/ticket acceptor 1022 and the card reader 1028 can each have separate wireless interfaces for interacting with the mobile device. In one embodiment, these wireless interfaces can be used with a wireless payment system, such as Apple Pay™ or Google Pay™. The wireless payment system can be used to transfer funds to the gaming machine that can be used for wager-based game play.

The door 1014 can allow access an interior of the cabinet 1008. In addition, via this access 1014, devices mounted to the cabinet, such as display 1018, speaker 1020, bill/ticket acceptor 1022 or printer 1024 can be serviced and maintained. For example, a receptor configured to receive currency and tickets, coupled to the bill acceptor, can be emptied. The receptor is often referred to as a bill stacker. In another example, blank tickets can be added to the printer 1022 or paper jams can be cleared from the printer. When door 1014 is opened, the gaming machine can enter a hard tilt state where game play is disabled.

In addition, a number of devices (not shown) can be provided within the interior of the cabinet 1008. A portion of these devices is not visible through an aperture in the gaming machine cabinet 1008. For example, a gaming machine controller (GMC) which controls play of a wager-based game on the gaming machine can be found within the cabinet 1008. Typically, the gaming machine controller is secured within a separate lockable enclosure.

As another example, a number of security sensors can be placed within the interior of the cabinet 1008. The security sensors can be configured to detect access to the interior of the gaming machine 1002. For example, the sensors can be configured to detect when the locking mechanism 1016 is actuated, the door 1016 is opened or a locking mechanism associated with the gaming machine controller enclosure is actuated. A power source, separate from an external power supply, such as a battery can be provided which allows the security sensors to operate and be monitored when the external power supply is not connected.

In particular embodiments, the cabinet 1008 can have a sheet metal exterior designed to provide the rigidity needed to support top boxes, such as 1010 and light kits as well as to provide a serious deterrent to forced entry. For example, the sheet metal can be sixteen gauge steel sheet. Additionally, the door, such as 1014, can be backed with sheet steel in the areas around the displays. Other materials, such as wood, wood composites, can be incorporated into the cabinet and the example of sheet metal is provided for the purposes of illustration only.

A speaker, such as 1020*a* or 1020*b*, can be protected by a metal screen. In one embodiment, a speaker, such as 1020*a* or 1020*b*, can be a subwoofer speaker. In general, a sound system associated with the gaming machine 1002 can include an audio amplifier and one or more speakers of various types, such as subwoofers, midrange speakers and tweeters.

If the main cabinet 1008 is entered, a "DOOR OPEN TILT" can be displayed halting game play and causing a "DOOR OPEN" event to be sent to the slot accounting system in 1004. In one embodiment, this message can be displayed on the main display 1018. These events can also be stored to the power hit tolerant memory. Upon door closure, the "DOOR OPEN TILT" will be replaced with a "DOOR CLOSED TILT" that can clear after the completion of the next game cycle. Additionally, a logic "DOOR OPEN TILT" can occur if the logic door is opened. The logic door is configured to be lockable independent of how the switch wiring is installed. The gaming machine 1002 can be configured to initiate the logic DOOR "OPEN TILT" regardless of whether or not a lock is installed on the logic door.

The displays 1018, 1012 and 1026, the speakers 1020, the printer 1022, the bill acceptor 1024, the card reader 1028 and the button panel 1030 can be used to generate a play of a wager-based game on the gaming machine 1008. Further, the display 1018 can include a touchscreen. The touchscreen can be used to provide inputs used to play the wager-based game. Some examples of wager-based games that can be played include but are not limited to slot games, card games, bingo games and lottery games. The wager-based games are typically games of chance and utilize a random number generator to determine an outcome to the game.

In general, the wager-based games can be classified as Class II and Class III games. Class II games can include bingo, pull tabs, lottery, punch board, tip jars, instant bingo and other bingo like games. Class III games can include but are not limited to slot games, black jack, craps, poker and roulette.

As described above, the wager-based game can be a slot game. The play of the slot game can involve receiving a wager amount and initiating a start of the wager-based game. A selection of a wager amount and a start of the wager-based game can be performed using buttons, such as 1032 and 1034, on button panel 1030. In addition, the button panel can be used to perform gaming functions, such as selecting a number of lines to play in a slot game, selecting the amount to wager per line, initiating a cash-out and calling an attendant. These functions will vary for different types of games.

In some embodiments, a touch screen can be provided over one or more of the displays, such as 1012, 1018 and/or 1026. The combination of the display and touch screen can be used to perform gaming functions that performed using the button panel 1030. Also, display and touch screen can be used to perform operator features, such as providing a game playback or a hand pay.

The play of wager-based game, such as a slot game, can involve making a wager and then generating and outputting a game presentation. The bet amount can be indicated in 1042. The game presentation can include a number of game features that vary from game to game. The game features provide variety in how the outcome to the wager-based is presented. For example, an award to the outcome of the game can be presented in a series of steps that vary from game to game. In some instances, a portion of the total award for a game can be awarded in each step. The steps and their graphical presentation can be referred to as game features. In various embodiments, information associated with one or more of the steps can be stored to a power hit tolerant memory.

As an example, a portion of a slot game outcome presentation is shown on display 1018. The slot game outcome presentation can include displaying a plurality of symbols, such as 1038. During the game outcome presentation, the symbols can appear to move on the display 1018. In addition, symbols can move off the display and new symbols can appear on the display.

Different combinations of symbols can appear on the display for some period of time, which varies for each instance of the wager-based game that is played. At the end of the presentation, the symbols reach a final position and an award associated with the game outcome is presented on the display. The total award for the game can be indicated in 1044 and the total credits available on the gaming machine after the award can be indicated in 1040.

In one embodiment, the game can be a progressive game. In a progressive game, the gaming machine 1002 can contribute a portion of the amount wagered on each game to a progressive jackpot. To allow larger progressive jackpots to be offered, a number of gaming machines can be linked together and each contribute to the progressive jackpot. In a progressive game, the progressive jackpot can be the largest award available on the gaming machine 1002 with the lowest odds of occurring. Although, progressive games with more than one progressive jackpot where the odds of winning vary from progressive jackpot to progressive jackpot can also be provided.

To enable a progressive game, the gaming machine 1002 can communicate with a remote server. Via the communications, the gaming machine 1002 can report contributions to the progressive jackpot, receive a current progressive jackpot total and report when an award of a progressive jackpot has been triggered. These communications require support on the server side. Communications can occur over a local area network, such as within a casino, or over a wide area network (e.g., the Internet), which is outside of the casino. Further details of these communications between the gaming machine 1002 and a remote server and the support on the server side are described in more detail below with respect to FIGS. 2, 3, 4A, 4B and 5.

In other embodiments, a portion of the award to the outcome of the game can be presented as a bonus game. The portion of the award can be referred to a bonus award. The presentation of the bonus award can also be presented in steps where a portion of the bonus award is awarded in each step. These steps can be referred to as bonus game features. In some embodiments, information associated with the steps in the bonus game can be stored to the power hit tolerant memory. In various embodiments, components of the bonus game presentation can be presented on one or more of display 1018, 1012 and 1026.

When a wager-based game is not being played on the gaming machine 1002 in a game play mode, the gaming machine can enter into an attract mode. In an attract mode, graphics can be output on one or more of displays 1018, 1012 and 1026, which are designed to draw a player's attention to the gaming machine 1002. In addition, the gaming machine can output sounds as part of an attract mode.

Next, with respect to FIG. 2, further details of the network services 1004 and gaming machine operations are described. In FIG. 2, another embodiment of a gaming system 1050 is shown. Gaming system 1050 includes three banks of gaming machines, 1052a, 1052b and 1052c. For the purposes of illustration, three gaming machines are shown in each bank.

The network services 1004 includes a central determination server 1054, a local progressive server 1056, a wide area progressive server 1058, a player tracking/slot accounting system server 1060 and ticket-in/ticket-out (TITO) server 1062. In gaming system 1050, all of the gaming machines in each bank, 1052a, 1052b and 1052c, are connected to the slot accounting system server 1060 and the TITO server 1062. However, only the gaming machines in bank 1052a are connected to the central determination server 1054. Further, only gaming machines in bank 1052b and display 1068 are connected to the local progressive server 1056. Finally, only the gaming machines in bank 1052c are connected to the wide area progressive server 1058. The communication connections between the gaming machines in each bank and the servers 1054, 1056, 1058, 1060 and 1062 can be wired connections, wireless connections or combinations thereof.

In various embodiments, the central determination server 1054 can be used to generate a portion of the game played on the gaming machines in bank 1052a. For example, the central determination server 1054 can be used to generate random numbers used to determine outcomes to the games played in bank 1052a. In another example, the central determination server 1054 can be used to generate all or a portion of the graphics used to play the games on the gaming machines in bank 1052a. For instance, the central determination server 1054 can be configured to stream a graphical presentation of a game to a gaming machine, such as 1064. The graphical presentation can be output to a display on the gaming machine.

In one embodiment, the central determination server 1054 can be used to generate numbers used in a bingo type games played on the gaming machine in bank 1052a. These bingo type games are often referred to as class II games whereas traditional slot machines are referred to as class III games. In class II games, a draw of numbers is made. The numbers can be mapped to a bingo card, which the player purchases to play the bingo game. The draw of numbers can result in at least one winning game combination on the bingo cards participating in the current bingo game.

The central determination server 1054 can be configured to repeat the number draws for the bingo games at regular intervals. For example, number draws can be repeated every 20 milliseconds. Players at the various gaming machines coupled to the central determination server 1054, such as the players at the gaming machine in bank 1052a, can initiate bingo games which utilize the bingo numbers from a particular bingo number draw. The bingo numbers in the number draw can be mapped to a bingo card displayed on the screen of the gaming machine, such as 1064.

Wins can be indicated by a winning pattern on the bingo card, such as four in a row or four corners. In response to a winning pattern on a bingo card on a particular gaming machine, the central determination server 1054 can send a prize amount associated with the win to the gaming machine with the winning pattern. This prize amount can be displayed on the gaming machine and the credits associated with the prize amount can be deposited on the gaming machine. For example, win of a bingo game on gaming machine 1064 can result in a prize amount being displayed on the main display. Further, the prize amount can be deposited as credits on the gaming machine 1064 such that the credits are available for additional game play.

In one embodiment, the prize amount can be output to look like a slot game. For example, if the prize amount is ten credits. Video reels can be displayed spinning on a main display of the gaming machine and a reel combination associated with a ten credit win in a slot game can be output to the display screen. If the outcome to the bingo game on a particular gaming machine is no award, then the video reels can be displayed spinning and a reel combination associated with no award in the slot game can be displayed on the gaming machine. This process can be repeated on various participating gaming machines, as number draws for various bingo games are initiated and completed on the central determination server 1054.

The local progressive server 1056 can be used to generate one or more progressive prizes that are limited to a local group of gaming machines, such as only the gaming machines in bank 1052*b*. When games are played on the gaming machine in bank 1052*b*, an amount of each wager can be contributed to one or more progressive prizes. The local progressive server can receive the contribution amounts from the gaming machines linked to the progressive game and can keep track of the prize amounts associated with the one or more progressive prizes. The prize amounts for the one or more progressive prizes can be output to displays on the participating gaming machines as well as to separate displays near the participating gaming machines.

The local progressive server 1056 can be configured to receive information regarding gaming events on the participating gaming machines. For example, the local progressive server 1056 can be configured to receive a notification from each of the participating gaming machines when a game outcome has occurred associated with a win of a progressive prize. In other examples, the local progressive server can be configured to receive gaming information, such as when each game is played on one of the participating gaming machines, an amount of wagered for each game and when one or more type of game outcomes occur on each of the gaming machines.

The gaming information associated with gaming events on the one or more gaming machines can provide a basis for additional bonus scenarios. For example, a bonus award can be triggered on one of the gaming machines after a random number of games are played on the gaming machines as a group. As another example, a bonus award can be triggered on one of the gaming machines after a particular game outcome occurs a random number of times on the participating gaming machines as a group, such as a particular combination of symbols appearing a random number of times.

The wide area progressive server 1058 is connected to the gaming machines in bank 1052*c* and display 1068. The wide area progressive server 1058 can be used to enable a progressive game played on gaming machines distributed over a wide area, such as multiple casinos distributed within a state. Similar to the local progressive server 1058, when wagers are made, the wide area progressive server 1058 can receive contributions to the progressive prize from the participating gaming machines. The wide area progressive server 1058 can report these contributions to a remote device which tracks the total progressive jackpot. Further, if a progressive jackpot is won on one of the gaming machines to which it is connected, the wide area progressive server 1058 event can be reported to the remote device. Yet further, the wide area progressive server 1058 can receive a current progressive jackpot amount from the remote device. The current progressive jackpot amount can be reported on displays on the gaming machines participating in the progressive jackpot and/or nearby signage, such as 1068.

The display 1068 can have a digital sign controller 1070. The digital sign controller 1070 can have a network interface which allows it to communicate with a remote device, such as the wide area progressive server 1058. In this example, the digital sign controller 1070 can be configured to output information to display 1068 associated with the progressive game, such as a current jackpot amount.

In general, displays with digital sign controllers can be provided through out a gaming environment, such as casino. The digital sign controller, such as 1070, can be configured to communicate with a remote device. The remote device can be configured to send information to the digital sign controller to output to a display. The information can include video, audio and picture data. Further, the remote device can be configured to send commands to the display, such as a command to output information to the display.

The slot accounting system portion of server 1060 can receive accounting information from each of the gaming machine in system 1050, such as an amount wagered for each game and amounts awarded on each gaming machine. The server 1060 can also receive information which uniquely identifies each gaming machine including a machine ID number and a current game being played on the gaming machine. The accounting information can be used for auditing purposes.

The player tracking system portion of server 1060 can track the game play of individual users. For example, a player can input account information into one of the gaming machines that is associated with a player tracking account that has been previously set-up. Based on the account information, a particular player tracking account can be located. The player tracking account can include information which identifies an individual user, such as user 1062 (User 1062 can be playing games at one of the gaming machines in bank 1052*a*.). The player tracking account information can include a player's name, address, phone number, gender, etc.

In one embodiment, a player, such as user 1062, can insert a player tracking card in a card reader (e.g., see card reader 1022 in FIG. 1). The card reader can read player tracking account information from the player tracking card, such as on a magnetic strip on the card, and send the information to the player tracking/slot account system server 1060. Based upon the received player tracking account information, the player tracking system portion of server 1060 can locate a player tracking account.

The player tracking account information can be input via other means on the gaming machine. For example, as shown in FIG. 1, the gaming machine 1002 may be able to communicate with a mobile device, such as 1006. Thus, in one embodiment, the gaming machine 1002 may be configured to directly receive player tracking account information from a mobile device. In another embodiment, the gaming machine 1002 may be configured to generate an input interface on a touch screen display that allows a player to input player tracking account information.

After the player provides account information and an account is located, the player tracking system can enter accounting information associated with a player's game play into the identified player tracking account, such as an amount wagered over time. As described above with respect to FIG. 1, the accounting information associated with a player's game play can provide a basis for awarding comps to the player. For example, based upon a player's previous game play, the player tracking system portion of server 1060 can send an amount credits to the gaming machine on which the player is playing. In another example, the player tracking system portion of server 1060 can send a command to a printer (e.g., see 1022 in FIG. 1) on the gaming machine on which the player is playing to print out a ticket. The ticket can be redeemable for goods or services or a discount on goods or services, such as a free meal or discount a meal.

As described above, each of the gaming machines can be coupled to a ticket-in/ticket out (TITO) server 1062. TITO server 1062 can be used to generate and validate instruments associated with a credit and/or cash value. One example of an instrument, which can be generated and validated, is a printed ticket. Another example is a digital instrument, such as a printed ticket stored in a digital form. In one embodiment, a digital instrument can be stored on an electronic device carried by a user, such as a mobile device carried by user 1062.

As an example, when a printer, such as 1022, is employed in a "cash out," the gaming machine controller (not shown) can contact a TITO server (e.g., see 1062 in FIG. 2) with a cash out amount. In response, the TITO server can generate a unique number, associate the unique number with a value and send the gaming machine a unique number. The unique number can be sent to a printer (e.g., see printer 1022 in FIG. 1). Then, the printer can print a ticket with the unique number, such as a unique number encoded in a bar-code, and a value of the ticket, such as five dollars.

When the ticket is later presented for redemption, the unique number can be used to validate the ticket. For example, the user 1062 can "cash out" at a first gaming machine, such as 1064 in bank 1052a, and receive a printed ticket with a unique number generated by the TITO server 1062. Then, the user 1062 can go to a gaming second gaming machine, such as 1066 in bank 1052c, and insert the ticket into a bill acceptor (e.g., see 1024 in FIG. 1). The second gaming machine 1066 can contact the TITO server 1062 and send the ticket information, i.e., the unique number read from the ticket, to server 1062. Then, the server 1062 can validate the ticket and send back to the second gaming machine 1066 an amount of credits to deposit on the second gaming machine. The deposited credits can be used for additional game play.

In these examples, the servers can include processors, memory and communication interfaces. Various gaming functions are associated with each of the servers, 1054, 1056, 1058, 1060 and 1062. The described distribution of gaming functions is for the purposes of illustration in only. In alternate embodiments, combinations of gaming functions can be combined on the same server or repeated on different servers. For example, the central determination server 1054 can also be configured to provide a local progressive to the bank of gaming machine 1052a. In another example, the local progressive server 1056 can be configured to provide a number of different progressive prizes for different groups of gaming machines. In yet another example, the player tracking system portion of server 1060 can be configured to provide bonusing features at each of the gaming machines.

Next, with respect to FIGS. 3, 4A, 4B and 5, apparatus and method for validating processes executing on a server linked to a group of gaming machines is described. The processes can be used to provide game play services to the group of gaming machines, such as progressive game play services. In particular, the apparatus and method can be associated with validating processes which utilize ports to provide the game play services. Ports can be mechanical structures that accept a mechanical device. However, as described in more detail as follows and utilized herein, a port can be an abstraction of an aspect of a communication architecture which is implemented in software.

In more detail, in the internet protocol suite, a port can be an endpoint of communication in an operating system. Thus, a port can be associated with an IP address of a host and the protocol type of the communication, and thus completes the destination or origination network address of a communication session. A port can identified for each address and protocol by a 16-bit number, commonly known as the port number. For example, an address may be "protocol: TCP, IP address: 1.2.3.4, port number: 80", which may be written 1.2.3.4:80 when the protocol is known from context.

Specific port numbers can often be used to identify specific services, such as game play services. If desired, after initial communication binds to the well-known port number, this port can be freed by switching each instance of service requests to a dedicated, connection-specific port number, so that additional clients can be serviced. The protocols that primarily use ports are the transport layer protocols, such as the Transmission Control Protocol (TCP) and the User Datagram Protocol (UDP). However, other types of protocols are possible and these two are provided for the purposes of illustration only.

As described above, remote servers can utilize processes and ports to provide game play services to linked gaming machines. For example, servers can provide ports for progressive games which involve progressive jackpots awards in the millions of dollars. Thus, the ports can be associated with services which affect a credit amount that is available and can be dispensed from the gaming machines in communication with the server.

Ports can be a vector of attack. For example, a server can use a gaming process and a port to indicate a progressive jackpot amount when a gaming machine indicates a progressive jackpot has been won. A malicious process listening to the port can be used to substitute an incorrect jackpot amount, such as amount higher than would have been awarded. As another example, a server can use a gaming process and a port to indicate a value amount for a ticket cashed in at a gaming machine. A malicious process listening to the port can be used to substitute an incorrect ticket amount, such as amount of higher value than indicated on the ticket. As follows, methods and apparatus, which can help prevent these attacks, are described.

Figure 3:
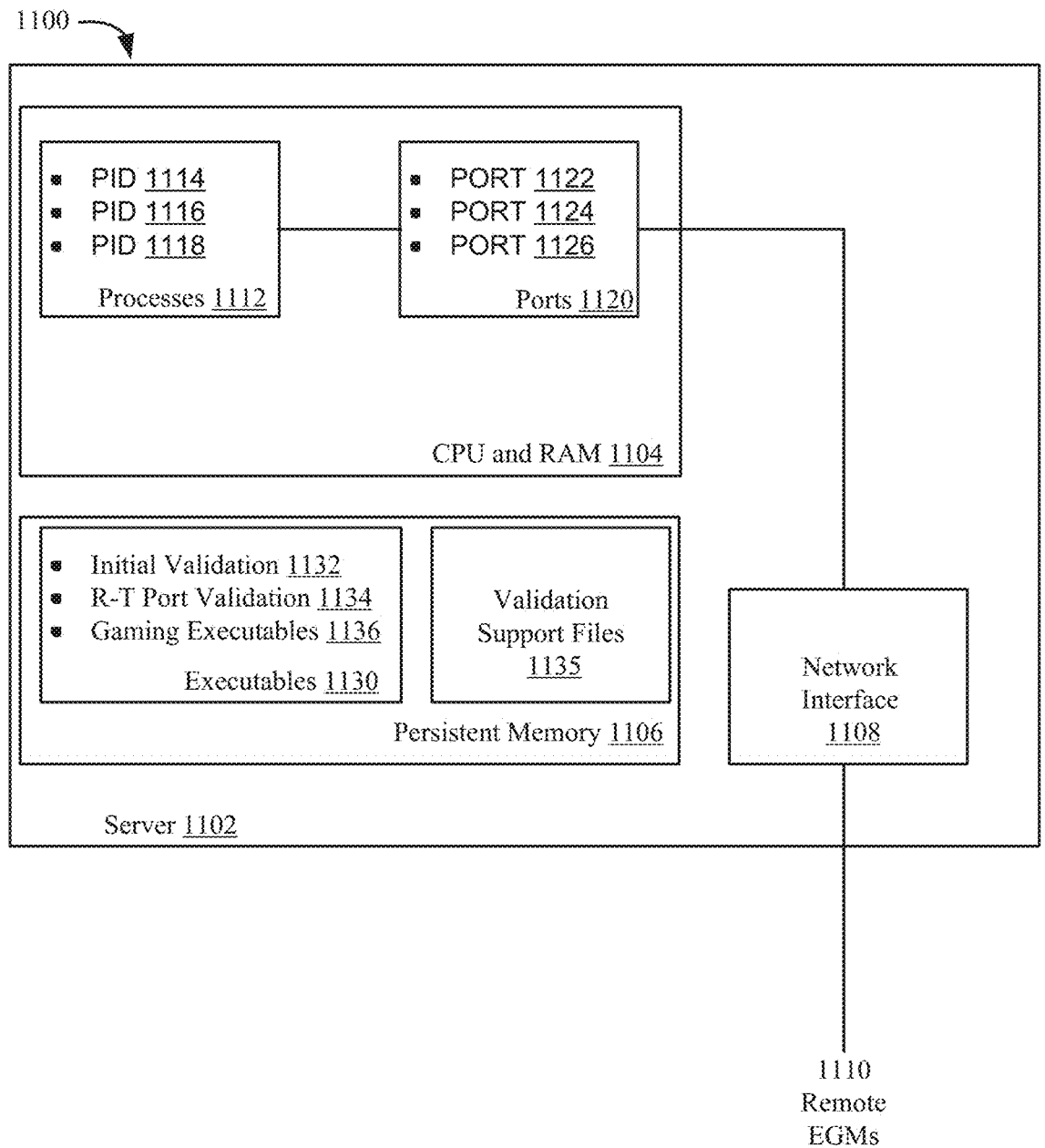
FIG. 3 illustrates a block diagram of gaming system including a server which executes processes to provide gaming services for linked gaming machines in accordance with embodiments of the present invention.

FIG. 3 illustrates a block diagram of gaming system 1100. The gaming system includes a server 1102 coupled to a plurality of remote gaming machines 1110. For example, in FIG. 2 gaming machines 1052a, 1052b and 1052c are each coupled to one or more remote servers. The server 1102 can be coupled to these gaming machines. The server 1102 and gaming machines, 1052a, 1052b and 1052c, can utilize a port architecture to communicate with the server, such as ports afforded by a TCP architecture.

The server includes one or more processors and RAM, such as CPU and RAM 1104, persistent memory, such as persistent memory 1106 and a network interface 1108. The persistent memory 1106 can include one or more hardware memory devices. Within the persistent memory 1106 can be stored executables 1130 which are loaded into the CPU and RAM 1104 and executable. For example, the persistent memory can include executable software 1132 for initially validating the gaming executables 1136 used to provide various gaming services.

As another example, the persistent memory can store real-time (R-T) port validation executable 1134. As will be discussed in more detail below, the R-T port validation executable can be used to validate processes which are listening to ports through which gaming services are being provided. A process can be an instantiation of an executable which is loaded into the RAM 1104 for execution by the the CPU. One or more of the gaming executables 1136 can be configured to generate the gaming services. Thus, one or more of the gaming executables can be associated with processes which are listening to the ports.

The initial validation executable 1132 and R-T port validation executable 1134 can utilize validation information about the gaming executables 1136 to perform validation operations. This information can be stored in the validation support files 1135. For example, the validation information can include a name, a memory location and hash value of each gaming executable which is to be validated. Further, in the case of ports, the validation information can be mapped to specific ports, i.e., the name, the memory location and a hash value can be associated with a gaming executable among the gaming executables 1136 which is approved to monitor or utilize a specific port to provide a gaming service.

The validation information can be stored in the validation support files 1135. The validation support files 1135 can be used in the initial validation 1132 of the software as well as the on-going R-T port validation 1134 on server 1102. In some embodiments, the validation support files 1135 can be encrypted. Thus, prior to retrieving information from validation support files 1135, the R-T port validation executable 1134 can be configured to decrypt one or more of the validation support files 1135.

After the initial validation of the gaming executables 1136 and any other software considered essential (e.g., the operating system can be validated) by the initial validation executable 1132, the server 1102 can enter into an operational state where gaming services are provided via the gaming executables 1136. In particular, the gaming executables 1136 can be loaded into the CPU and RAM 1104 and executed as processes 1112.

Each of the gaming executables which are executed can be assigned a process ID number. Three PIDs, 1114, 1116 and 1118 are shown being executed within processes 1112. Many more processes can be instantiated and these three processes, 1114, 1116 and 1118 are shown for the purposes of illustration only. Further, only a portion of the processes 1112 can be associated with gaming services. For example, PIDs 1114 and 1116 can be associated with operating system functions whereas PID 1118 can be associated with a gaming service.

A number of ports 1120 can be provided for communication with devices remote to the server, such as gaming machines 1110. As described above with respect to FIG. 2, gaming machines 1052a, 1052b and 1052c are examples of remote gaming machines 1110. The ports 1120 can be a software abstraction associated with a network communication protocol, such as but not limited to TCP. The ports 1120 can utilize physical hardware, such as the network interface 1108, to carry out communications with the remote devices. The network interface can provide wired or wireless communication connections. Additional details of the TCP port architecture are described below with respect to FIGS. 4A and 4B.

In FIG. 3, three ports 1122, 1124 and 1126 are shown as being instantiated. The example of three ports is provided for the purposes of illustration only and is not meant to be limiting. More or less ports can be utilized. A port number can be associated with each port which is instantiated. The port number can be used to uniquely identify the port and its properties. The TCP protocol provides for the possibility of tens of thousands of ports to be instantiated.

A first portion of the ports 1120 can be associated with gaming related services and a second portion of the ports can be associated non-gaming related services. For example, ports 1122 and 1124 can be associated with a gaming related service whereas port 1126 can be associated with a non-gaming related service, such as an operating system related service. Each of the first portions of ports associated with gaming related services can be associated with at least one of the processes 1112 which are executing. In particular, the ports associated with gaming related services can be associated with a gaming executables 1136 loaded from persistent memory and executed in CPU and RAM 1104. These processes can be referred to as gaming processes.

The R-T port validation executable 1134 can be loaded from the persistent memory 1106 and executed by the CPU and RAM 1104 as one of the processes 1112. The R-T port validation process can be configured to monitor one or more of the first portion of ports associated with a gaming related services. In particular, the R-T port validation process associated with the executable 1134 can be configured to maintain a list of ports which are to be monitored. In addition, the R-T port validation process can be configured to determine which processes in processes 1112 are associated with each of the ports in 1120 that are monitored. Once the one or more processes associated with a monitored port are identified, each of the one or more processes can be validated to determine whether it is a valid gaming process using the validation support files 1135.

In particular embodiments, the R-T port validation executable 1136 can be configured to determine one or more of 1) whether a gaming process associated with a port has a correct name, 2) whether the gaming process has been loaded from a correct location in the persistent memory 1106, 3) whether the gaming process has a correct hash value, 4) whether the gaming process was started at a correct time and 5) combinations thereof. The hash function, such as a secure hash algorithm (SHA) can be performed on an executable image that was loaded into the CPU and RAM from a memory device, such as the persistent memory 1106. The value determined from the hash function can be compared to an expected value of the hash function for the examined process. SHA-1, SHA-2, SHA-3, SHA-256 and MD-5 are few examples of hash functions which can be utilized.

The expected value of the hash function can be stored in the validation support files 1135. In various embodiments, when the expected value of the hash function doesn't match the result determined from the executable image which is being validated, a remedial action can be generated. For example, an alert message can be generated. As another example, an error condition can be generated when the gaming process associated with the port is determined to be invalid. In response, the gaming process can be terminated. In yet another example, when a game, such as a progressive game, is associated with the port and the process associated with the port is determined to be invalid, an error condition can be generated. In response, a command can be sent out which freezes the play of the game on the gaming machines in communication with the server 1102 that are providing the progressive games.

The R-T port validation executable 1134 can be configured to repeat the port validation operations at some time interval while the server is operational to provide gaming services. For example, the R-T port validation executable 1134 can monitor and validate processes associated with each monitored port every 1, 2, 5, 10 seconds etc. The R-T port validation executable 1134 can be configured to monitor a clock available on the server 1102 and repeat the validation operations in accordance with the specified time interval.

Figure 4:
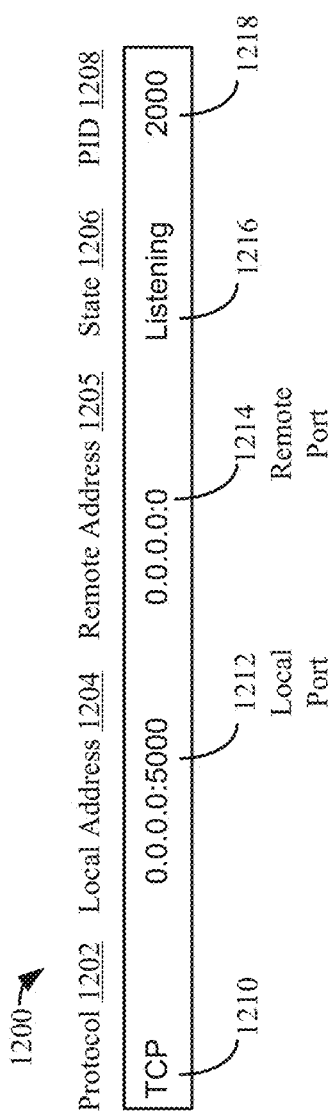
FIGS. 4A and 4B illustrate processes and information about processes executing on a server which are linked to critical ports associated with providing services for linked gaming machines in a gaming system in accordance with embodiments of the present invention.

Next, some additional details of monitoring ports and determining information about processes associated with ports are described with respect to FIGS. 4A and 4B. Most operating systems providing commands which allow network information to be gathered. For example, in the Microsoft™ operating system (Redmond, Wash.) provides a "netstat" command which allows information associated with instantiated ports to be provided. Other operating systems provide similar commands and the "netstat" command is provided for the purposes of illustration only.

FIG. 4A provides an example of output 1200 from a "netstat" command for a single port. In this example, for each instantiated connection, which can be referred to as a "socket," a protocol 1202, local address 1204, foreign address 1205, state of the connection 1206 and Process ID (PID) 1208 can be output. The protocol 1202 can be TCP, UDP or some other network protocol. In one embodiment, the local address 1204 can have a four number IP address format and a port number. The remote address 1205 can have a four number IP address format and a port number. The local address 1204 and remote address 1205 can establish endpoints for a connection between two devices over a network in accordance with the network protocol. The PID can be an identifier of a process executing on the server which is utilizing the socket.

The address in FIG. 4A is in an Internet Protocol version 4 (IPv4) format. In alternate embodiments, an Internet Protocol version 6 (IPv6) protocol format can be utilized. The IPv6 format is represented by eight groups of four hexadecimal digits separated by a colon, each group representing 16 bits, for a total of 128 bits. The format can be used for unicast addressing, anycast addressing and multicast addressing. Other addressing methods are possible and IPv4 and IPv6 are provided for the purposes of illustration only.

A number of states are possible for the socket. "ESTABLISHED" can mean the socket has an established connection. "SYN_SENT" can mean the socket is actively attempting to establish a connection. "SYN_RECV" can mean connection request has been received from the network. "FIN_WAIT1" can mean the socket is closed, and the connection is shutting down. "FIN_WAIT2" can mean the connection is closed, and the socket is waiting for a shutdown from the remote end.

"TIME_WAIT" can mean the socket is waiting after close to handle packets still in the network. "CLOSE" can mean the socket is not being used. "CLOSE_WAIT" can mean the remote end has shut down and is waiting for the socket to close. "LAST_ACK" can mean the remote end has shut down, the socket is closed and waiting for acknowledgement. "LISTENING" can mean the socket is listening for incoming connections. CLOSING can mean both sockets are shut down but we still don't have all our data sent. UNKNOWN can mean the state of the socket is unknown.

In FIG. 4A, the socket is utilizing the TCP protocol 1210. The local address 1204 includes a port 1212 which is port five thousand. The remote port 1214 is not specified. The state 1206 of the connection is "LISTENING." A PID 1208 is associated with connection. In this example, the PID number 1218 is two thousand.

The server (see 1102 in FIG. 3) can be configured to instantiate a gaming process which is associated with a port. Only, a single process can be associated with the port per protocol. For example, within the implementation of Transmission Control Protocol (TCP) only a single port can be associated with a particular port number. However, an implementation of a User Datagram Protocol (UDP) may utilize the same port number that is being used in an implementation of the TCP. Thus, when 1200 is associated with a gaming process and TCP is used, only one process using TCP can be associated with port 1212. In this example, port 1212 is assigned a value of five thousand.

In general, a network statistics commands can be configured to return information about all the instantiated connections including a local port number for each connection and a PID for each connection. The R-T port validation executable 1136 (see FIG. 3) can be configured to parse this information against a list of ports that it is monitoring. In FIG. 4A, for each socket which includes a port that it is monitoring, the R-T port validation executable 1136 can determine a PID number 1218. In this example, the PID number 1218 is two thousand.

The R-T port validation executable 1136 (see FIG. 3) can be configured to access expected information about a gaming process that is supposed to be associated with each port it is monitoring. As described above in FIG. 3, this information can be stored in the support validation files (see 1135 in FIG. 3). Based upon the PID number associated with a port it is monitoring, the R-T port validation executable can find out additional information about the gaming process.

Thus, to validate a gaming process associated with a port, the R-T port validation executable 1136 can be configured to compare information obtained using the PID with the expected information about the gaming process. When the information obtained using the PID is the same as the expected information about the gaming process, the gaming process can be considered validated. When the information obtained using the PID is not the same as the expected information about the gaming process, the gaming process can be considered invalid. In response, an error condition can be generated and a remedial action can be determined.

FIG. 4B illustrates some of the information that can be obtained for each PID that is associated with a port that is monitored by the R-T port validation executable 1136 (see FIG. 3). In one embodiment, for each PID 1208 which is identified, one or more of 1) a process name 1254, 2) an image name 1256, 3) an image file path 1258, 4) a start time 1260, 5) an amount of memory utilized 1262 and 6) a description 1264 of the process can be obtained. For example, in 1250, the PID 1208 is "two thousand," the process name 1254 is "Progressive JPT," which stands for progressive jackpot total, and the image name 1256 is "Progressive_JP_Total.exe."

The image path 1258 is a location on a file system on a memory device associated with server 1102 (see FIG. 3). In 1250, the image path is "C:\Path\Progressive_JP_Total.exe." The start time 1260 can be a time when the PID is instantiated. In 1250, the start 1260 is "11:13:02." The memory 1262 can be how much memory the image is using. In 1250, the amount of memory is "5000 Kilobytes." The description 1264 can be information about the gaming process. In this example, the description 1264 is that the gaming process "Updates Jackpot."

All or a portion of the information in 1250 can be used by the R-T port validation executable 1136 to validate a gaming process. For example, the process name 1254, "Progressive JPT," can be compared to an expected gaming process name obtained from the validation support file 1135. Further, the image name 1256, "Progressive_JP_Total.exe," can be compared an expected image name obtained from the validation support file 1135.

In addition, the image path 1258, "C:\Path\Progressive_JP_Total.exe," can be compared to an expected image path obtained from the validation support file 1135. For example, an invalid program can be executed from a portable memory device, such as a thumb drive. The file path to the invalid program can be inconsistent with the expected file path. Thus, the file path can be considered an invalid file path. Hence, an error condition can be generated. In response to the error condition, a remedial action can be generated.

In addition, a hash algorithm can be run on the image at the location indicated by the image file path 1258. The value from the hash algorithm can be compared to an expected value obtained from the validation support file 1135 (see FIG. 3). This check can uncover an attempt to replace the image at the path location with a malicious image that doesn't operate as intended. The memory 1262, "5000 Kilobytes" can be compared to an expected memory use obtained from the validation support file 1135 (see FIG. 3). Finally, the description 1264, "Updates Jackpot," can be compared to the expected description obtained from the validation support file 1135.

In some embodiments, the start time 1260 can be used. A valid start time can be the time that a valid gaming process is loaded. In one embodiment, the valid time can be when the server is first booted up, the gaming executable associated with gaming process has been validated and the gaming executable has been instantiated as a gaming process. Thus, the first time when the gaming process is first instantiated as a gaming process after validation can be stored. If the valid gaming process is subsequently terminated and invalid process is later loaded, the start time can be compared with the first time. Since the invalid process was started after the first, the start time of the invalid process can be different from the first time. Hence, an error condition can be triggered when the start time and saved first time are compared and found to be significantly different.

In the paragraphs above, one or more of the comparisons can be used to determine whether an error condition has occurred. For example, in one embodiment, an error condition can be triggered only when a hashing algorithm indicates a hash of an identified image doesn't match its expected value. In another example, an error condition can be triggered when the image path is incorrect even if the hash algorithm yields the expected value for the identified image.

Figure 5:
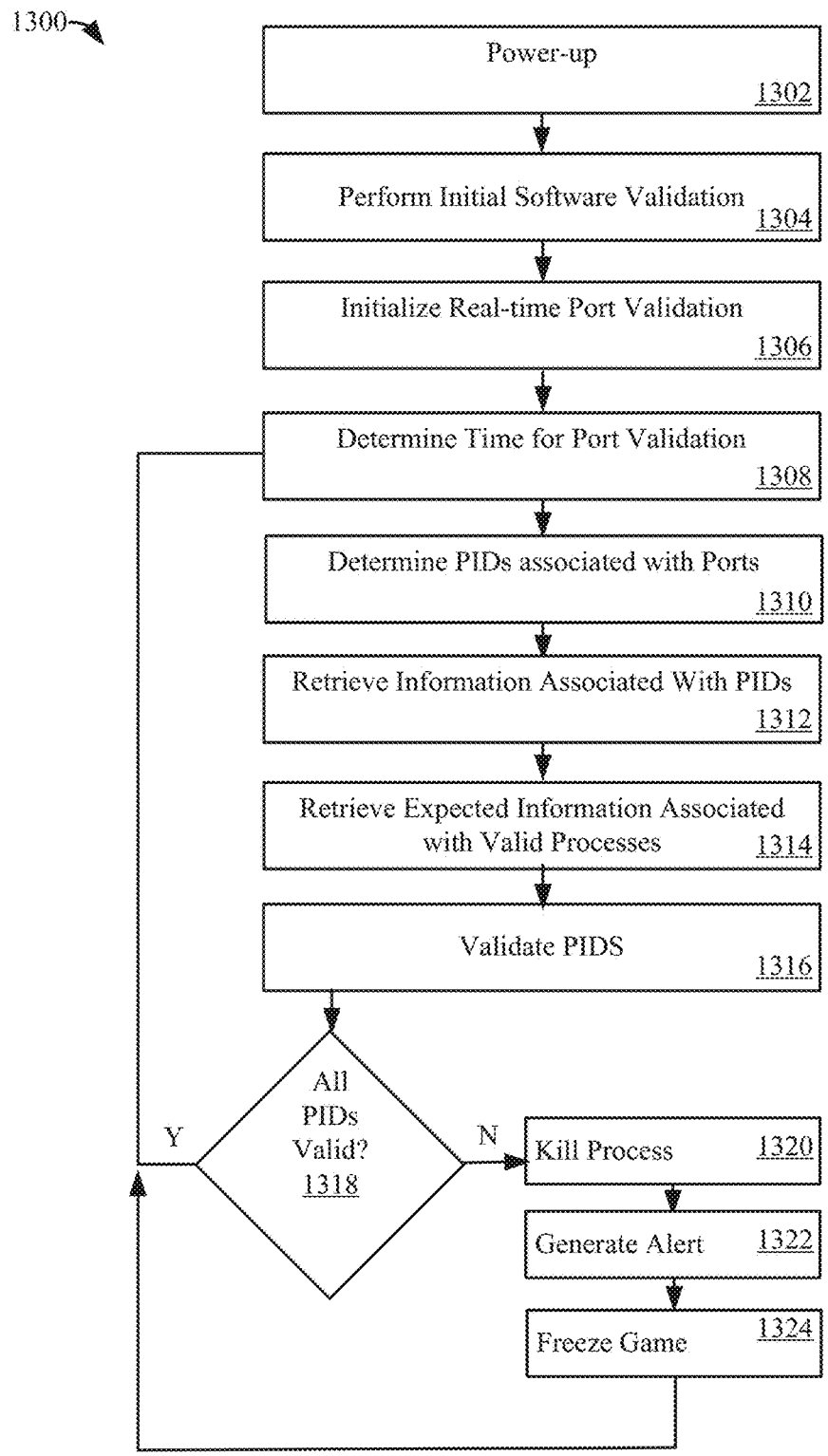
FIG. 5 illustrates a block diagram of a method of validating processes on a server which provide services for linked gaming machines in a gaming system in accordance with embodiments of the present invention.

Next, a method 1300 of validating processes associated with ports, which provide gaming services, is described with respect to FIG. 5. In 1302, the server, such as 1102 in FIG. 3, can power-up into an operational state. In 1304, an initial software validation can be performed on the server. The initial software validation can involve comparing expected information about software modules to information gathered in situ. For example, one or more hash algorithms can be applied to gaming executables residing the server. The values returned from the hash algorithms can be compared to expected values. In one embodiment, in 1304, the executable for the R-T port validation can be validated.

After the R-T port validation executable 1136 is validated (see FIG. 3), in 1306, the real-time port validation executable can be instantiated as a process on the server. The R-T port validation process can perform a validation on network ports according to a set time intervals, such as every ten seconds. In 1308, the R-T port validation process can determine it is time to begin a port validation.

In 1310, the R-T port validation process can gather network information about all of the network sockets instantiated on the server. For example, when a Microsoft™ operating system is being utilized, the "netstat" command can be utilized. The network information can provide information about ports which are being utilized and process associated with each port.

The R-T port validation process can be configured to validate processes associated with particular ports, such as ports used to provide gaming services. For example, the R-T port validation process can be used to validate ports and processes associated with providing a progressive game on the server. In another example, the R-T port validation process can be used to validate ports and processes associated with providing TITO services on the server. In another example, the R-T port validation process can be used to validate ports and processes associated with providing player tracking services on the server, such as services related to promotional credits, comps or mystery bonuses. In some embodiments, the R-T port validation process can monitor ports which can affect credit values on gaming machines to which the server is connected.

In 1310, the R-T port validation process can be configured with a list of ports which are to be monitored. When the network information is obtained, it can be parsed against the list of ports which are being monitored. When a port, which is on the list of ports, is identified in the network information, a PID associated with the port can be identified. In this manner, by parsing the network information, one or more PIDs associated with one or more ports can be identified.

In 1312, information can be retrieved for each of the identified PIDs. This information can include, but is not limited to, a process name, an image name, a file path to an image associated with the process, a hash value of the image, a description of the process, a start time for the process and a memory size for the process. In 1314, expected information associated with valid processes can be retrieved, such as the expected process name, the expected image name, the expected file path to an image associated with the process, the expected hash value of the image, the expected description of the process, the expected start time for the process and the expected memory size for the process. In some embodiments, the expected information can be stored in an encrypted file residing on the server, which is decrypted to allow the expected information to be accessed.

In 1316, by comparing the information gathered about the identified PIDs with the expected information, each gaming process associated with an identified PID can be validated. Typically, when the in situ information gathered about an identified PID matches the expected information, the process can be considered validated. In 1318, each of the identified PIDs can be checked for validity.

In 1318, when an identified process is considered invalid, an error condition can be generated. In response to the error condition, a remedial action or actions can be taken. For example, in 1320, the gaming process can be killed. In addition, in 1322, an alert can be generated. Optionally, in 1324, gaming machines associated with the progressive server, which utilizes the invalid process, can be affected. For example, if the invalid process is associated with the play of a progressive game on the gaming machines, then, in response to the error condition, the play of the progressive games on the gaming machines may be temporarily suspended.

After a remedial action is taken, such as one or more of 1320, 1322, 1324 or combinations thereof, the server can remain operational in some manner. Thus, the server can include ports which are still monitored. Thus, after the remedial action, the method can be repeated from 1308 for the remaining ports which are still monitored. In addition, after the process is killed in 1320, the server can be configured to determine a valid executable to associate with the port, validate the executable and instantiate the executable as a process. Then, again, after the remedial action, the method can be repeated from 1308.

In 1318, when all of the identified PIDs are determined to be valid, the method can be returned to step 1308. After a time interval has elapsed, the method can be repeated from 1308. This method can be repeated while the server is an operational state to protect from ports from attack by malicious programs.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A server providing gaming-affecting services to corresponding gaming machines, the server comprising:
   a processor,
   a random access memory (RAM),
   a persistent memory and
   a network interface,
   the processor configured to
   1) initially validate a plurality of gaming executables stored on the persistent memory wherein the plurality of gaming executables, when executed, support the gaming-affecting services and include a first gaming executable which utilizes a first network connection on the network interface to provide a first one of the gaming-affecting services to at least one of the corresponding gaming machines and wherein, using a network protocol, a first local port of the server is specified for use with the first network connection,
   2) initially validate, before it is executed, a real-time process validation executable stored on the persistent memory,
   3) bad the validated first gaming executable into the RAM for execution by the processor,
   4) load the validated real-time process validation executable into the RAM for execution by the processor,
   5) using the network protocol and the network interface, instantiate a plurality of network connections, including the first network connection,
   6) using the validated real-time process validation executable, identify a plurality of local ports of the server associated with the plurality of network connections which are currently instantiated,
   7) using the validated real-time process validation executable, determine a first one of the plurality of local ports matches the first local port,
   8) using the validated real-time process validation executable, and in response to determining that the first local port matches the first one of the plurality of local ports, determine a first process identifier (PID) associated with the first one o the plurality of local ports,
   9) using the validated real-time process validation executable, determine whether a first process associated with the first PID is the initially-validated first gaming executable by comparing information obtained about the first process using the PID with corresponding predetermined information expected from the initially-validated first gaming executable, and
   10) in response to determining that the first process is not the initially-validated first gaming executable, prevent the first process from participating in the gaming-affecting services.

2. The server of claim 1, wherein the first gaming-affecting service sends gaming information to the corresponding gaming machines which affects an amount of credits on each of the corresponding gaming machines.

3. The server of claim 2, wherein the gaming information is selected from the group consisting of an award amount, a bonus amount, a comp amount and an amount associated with a ticket.

4. The server of claim 1, where the first gaming-affecting service is used to support a progressive game played on the corresponding gaming machines.

5. The server of claim 1, wherein the network protocol is used to define the first network connection over a local area network or a wide area network.

6. The server of claim 1, wherein the processor is further configured to repeat steps 6 through 10 at regular time intervals.

7. The server of claim 1, wherein the initial validation of each of the plurality of gaming executables includes determining a hash value for each of the plurality of gaming executables and comparing the hash value for each of the plurality of gaming executables to predetermined expected hash value for each of the plurality of gaming executables to determine whether each of the plurality of gaming executables is a valid executable.

8. The server of claim 7, further comprising a validation file stored on the persistent memory, the validation file including the predetermined expected hash values for each of the plurality of gaming executables.

9. The server of claim 1, wherein the processor is further configured to determine information about the first process using the PID, the PID-based determined information including one or more of an image name, a first process name, a file path to a first image associated with the first process, a first process description, a start time or a memory size utilized by the first process.

10. The server of claim 1, wherein the determination of whether the first process associated with the first PID is the initially-validated first gaming executable includes determining a file path to a first image associated with the first process, determining a hash value for the first image, retrieving a predetermined expected hash value for the first process and comparing the hash value to the predetermined expected hash value.

11. The server of claim 1, wherein the determination of whether the first process associated with the first PID is the initially-validated first gaming executable includes determining a file path to a first image associated with the first process, retrieving a predetermined expected file path and comparing the file path to the predetermined expected file path.

12. The server of claim 1, wherein the determination of whether the first process associated with the first PID is the initially-validated first gaming executable includes determining a start time associated with the first process, retrieving an expected start time and comparing the start time to the expected start time.

13. The server of claim 1, wherein the processor is further configured to respond to determining that the first process is an invalid process by terminating the first process.

14. The server of claim 1, wherein the plurality of gaming executables includes a second gaming executable which utilizes a second network connection on the network interface to provide a second gaming-affecting service to the corresponding gaming machines and wherein, using the network protocol, a second local port is specified with the second network connection.

15. The server of claim 14, wherein the processor is further configured to, initially validate a second of the plurality of gaming executables and then, using the validated real-time process validation executable, determine whether one or more of the plurality of local ports match the second local port, using the validated real-time process validation executable, and in response to determining that the second local port matches a second one of the plurality of local ports, determine a second process identifier (PID) associated with the second one of the plurality of local ports, using the validated real-time process validation executable, determine whether a second process associated with the second PID is the initially-validated second gaming executable, and in response to determining that the second process is not the initially-validated second gaming executable, prevent the second process from participating in the gaming-affecting services.

16. The server of claim 1, wherein the processor is further configured to determine that two of the plurality of local ports match the first local port and terminate processes associated with the matched two of the plurality of local ports that match.

17. A method executing in a server including a processor, a random access memory (RAM), a persistent memory and a network interface, the server providing gaming-affecting services to a plurality of gaming machines, the method comprising
1) initially validating a plurality of gaming executables stored on the persistent memory wherein the plurality of gaming executables includes a first gaming executable which utilizes a first network connection on the network interface to provide a progressive gaming service to the plurality of gaming machines and wherein, using a network protocol, a first local port is specified with the first network connection,
2) initially validating, before it is executed, a real-time process validation executable stored on the persistent memory,
3) loading the validated first gaming executable into the RAM for execution by the processor,
4) loading the validated real-time process validation executable into the RAM for execution by the processor,
5) using the network protocol and the network interface, instantiating a plurality of network connections, including the first network connection,
6) using the validated real-time process validation executable, identifying a plurality of local ports associated with the plurality of network connections which are currently instantiated,
7) using the validated real-time process validation executable, determining whether a first one of the plurality of local ports matches the first local port,
8) using the validated real-time process validation executable, and in response to determining that the first local port matches the first one of the plurality of local ports, determining a first process identifier (PID) associated with the first one of the plurality of local ports,
9) using the validated real-time process validation executable, determining whether a first process associated with the first PID is the validated first gaming executable by comparing information obtained about the first process using the PID with corresponding predetermined information expected from the initially-validated first gaming executable, and
10) in response to determining that the first process is not the initially-validated first gaming executable, preventing the first process from participating in the gaming-affecting services.

18. The method of claim 17, further comprising: receiving via the first network connection updates to a progressive jackpot based upon wagers made on each of the plurality of gaming machines.

19. The method of claim 17, further comprising: sending via the first network connection a current progressive jackpot amount to the plurality of gaming machines.

20. The method of claim 17, further comprising: receiving via the first network connection an indication that a progressive jackpot is to be awarded on one of the plurality of gaming machines and sending a current progressive jackpot amount to the one of the plurality of gaming machines.

* * * * *